(12) United States Patent
Hole

(10) Patent No.: US 10,231,075 B2
(45) Date of Patent: Mar. 12, 2019

(54) STORAGE AND USE OF SUBSTITUTE DIAL-IN NUMBERS FOR MOBILE CONFERENCING APPLICATION

(75) Inventor: David Philip Hole, Southampton (GB)

(73) Assignee: BlackBerry Limited, Waterloo, Ontario (CA)

(*) Notice: Subject to any disclaimer, the term of this patent is extended or adjusted under 35 U.S.C. 154(b) by 568 days.

(21) Appl. No.: 13/494,339

(22) Filed: Jun. 12, 2012

(65) Prior Publication Data

US 2013/0331075 A1 Dec. 12, 2013

(51) Int. Cl.
- H04M 3/42 (2006.01)
- H04W 4/02 (2018.01)
- H04W 4/16 (2009.01)
- H04M 3/56 (2006.01)

(52) U.S. Cl.
CPC ............... H04W 4/02 (2013.01); H04M 3/56 (2013.01); H04W 4/16 (2013.01)

(58) Field of Classification Search
CPC ........................................................ H04W 4/02
USPC ..... 455/416; 379/93.21, 158, 202.01, 205.01
See application file for complete search history.

(56) References Cited

U.S. PATENT DOCUMENTS

| 5,717,863 A | 2/1998 | Adamson et al. |
| 7,894,806 B2 | 2/2011 | Leigh et al. |
| 2008/0008105 A1 | 1/2008 | Black et al. |
| 2008/0020736 A1* | 1/2008 | Kim ................ H04M 1/274558 455/412.1 |
| 2009/0253420 A1 | 10/2009 | Stewart et al. |
| 2010/0093344 A1* | 4/2010 | Chan et al. .................... 455/433 |
| 2010/0227604 A1* | 9/2010 | Hsieh ...................... H04L 12/14 455/418 |
| 2010/0275134 A1 | 10/2010 | Baker et al. |
| 2011/0007887 A1 | 1/2011 | Green et al. |
| 2011/0034167 A1 | 2/2011 | Ben-Shaul et al. |
| 2011/0150194 A1 | 6/2011 | Narayanaswamy |
| 2011/0268262 A1 | 11/2011 | Jones et al. |
| 2012/0321060 A1* | 12/2012 | Lucey et al. ............... 379/93.21 |

OTHER PUBLICATIONS

Extended European Search Report dated Apr. 9, 2013, for European Patent Application No. 12171662.5 (8 pages).
Office Action in Canadian Application No. 2,818,636, dated Dec. 30, 2014, 2 pages.

* cited by examiner

Primary Examiner — Justin Y Lee
(74) Attorney, Agent, or Firm — Fish & Richardson P.C.

(57) ABSTRACT

Methods, systems, and devices are provided for joining a conference call on an electronic device. The exemplary methods include steps of receiving a communication and determining at least one replacement conference call phone number based on information in the communication. The exemplary methods further include steps of determining that the replacement conference call phone number is a preferred conference call phone number. The exemplary methods further include steps of initiating a dialing sequence using the preferred conference call phone number.

10 Claims, 9 Drawing Sheets

STORAGE AND USE OF SUBSTITUTE DIAL-IN NUMBERS FOR MOBILE CONFERENCING APPLICATION

FIELD

The disclosed embodiments are directed to systems and methods for facilitating a conference call. The embodiments are directed to enabling access to teleconference sessions for users.

BACKGROUND

Conference calling (or "teleconferencing") enables users to conduct a meeting at the same time, without having to come together in the same physical location. Typically, potential users who will participate in the teleconference will receive a dial-in number that allows the users to join the conference. After dialing the conference-call dial-in number, the users may be required to enter an access code and/or a pass code. Upon validation of these codes, the users will be connected to the call. The users can then all speak to one another.

Teleconferences can be useful for "road warriors"—those employees who are constantly traveling on behalf of their company and connect with their fellow employees or clients using their mobile device. Invitations to participate in a teleconference can come via electronic mail to their phones, and a reminder of the teleconference can be scheduled to pop up on the user's phone when the teleconference is about to begin. On some phones, a button reading "Join Now" or "Dial Now" may be displayed to the user. By extracting the dial-in number, the phone can facilitate joining the teleconference by automatically dialing the dial-in number and/or the pass code when the user presses the button.

A problem arises when a teleconference provider does not provide an appropriate dial-in number. For example, this can happen when users travel abroad with their mobile devices, but are required or requested to participate in a teleconference. An electronic mail message can arrive requesting their attendance in the teleconference, but the message only provides a dial-in number that is local to the device's home country or the home country of the sender of the mail message. Calling that number while overseas could subject the user to high overage fees, roaming charges, and exorbitant per-minute charges. For example, a user who normally lives in Canada, but currently is in Brazil on business, may not want to participate in a teleconference by dialing a Canadian telephone number by pressing the "Join Now" button, because of the high long-distance and roaming fees that would likely result from calling a Canadian number while in Brazil.

DESCRIPTION OF THE EMBODIMENTS

Reference will now be made in detail to disclosed embodiments, examples of which are illustrated in the accompanying drawings. Wherever possible, the same reference numbers will be used throughout the drawings to refer to the same or like parts.

The example embodiments permit a user's mobile device to, in part, automatically determine the proper dial-in number (or "conference call phone number") to dial when the mobile device receives an indication that it should dial into a teleconference, even when the mobile device has not received the proper access information for the teleconference.

Figure 1:
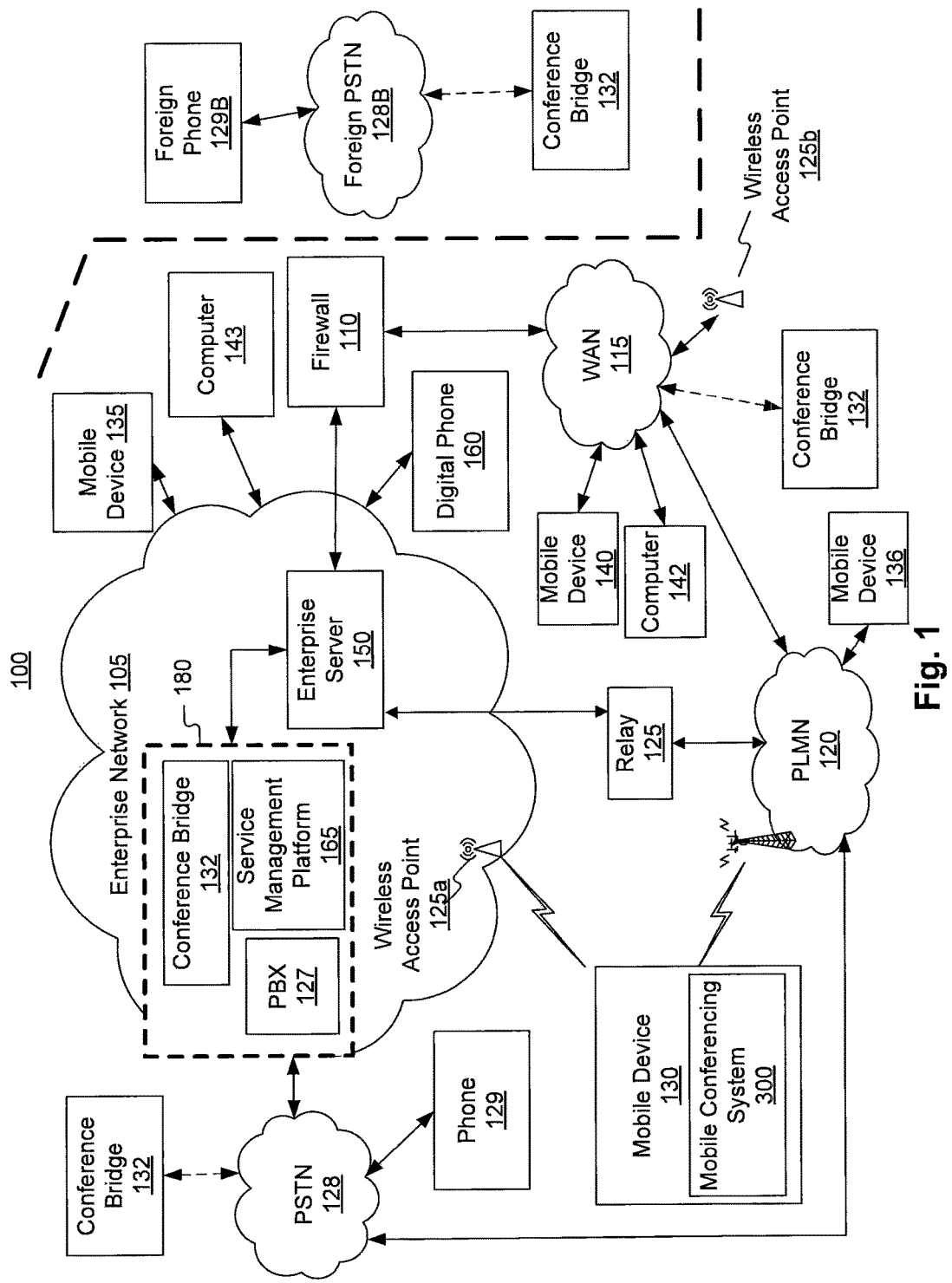
FIG. 1 shows, in block diagram form, an example system utilizing a mobile conferencing system.

Reference is now made to FIG. 1, which shows, in block diagram form, an example system utilizing a mobile conferencing system, generally designated 100, for the control and management of communications. System 100, in some embodiments, includes an enterprise network 105, which in some embodiments includes a local area network (LAN). In some embodiments, enterprise network 105 can be an enterprise or business system. In some embodiments, enterprise network 105 includes more than one network and is located in multiple geographic areas. In some embodiments, enterprise network 105 can be the Internet.

Enterprise network 105 can be coupled, often through a firewall 110, to a wide area network (WAN) 115, such as the Internet. Enterprise network 105 can also be coupled to a public switched telephone network (PSTN) 128 via direct inward dialing (DID) trunks or primary rate interface (PRI) trunks.

Enterprise network 105 can also communicate with a public land mobile network (PLMN) 120, which is also referred to as a wireless wide area network (WWAN) in some cases, a cellular network. The coupling with PLMN 120 is via a relay 125, as known in the art.

In some embodiments, enterprise network 105 provides a wireless local area network (WLAN), not shown, featuring wireless access points, such as wireless access point 125a. In some embodiments, other WLANs can exist outside enterprise network 105. For example, a WLAN coupled to WAN 115 can be accessed via wireless access point 125b. WAN 115 is coupled to one or more mobile devices, for example mobile device 140. Additionally, WAN 115 can be coupled to one or more desktop or laptop computers 142 (one shown).

System 100 can include a number of enterprise-associated mobile devices, for example, mobile devices 130, 135, 136, and 140. Mobile devices 130, 135, 136, and 140 can include devices equipped for cellular communication through PLMN 120, mobile devices equipped for Wi-Fi communications over one of the WLANs via wireless access points 125a or 125b, or dual-mode devices capable of both cellular and WLAN communications. Wireless access points 125a or 125b can be configured to WLANs that operate in accordance with one of the IEEE 802.11 specifications.

Mobile devices 130, 135, 136, and 140 can be, for example, cellular phones, smartphones, tablets, netbooks, and a PDA (personal digital assistant) enabled for wireless communication. Moreover, mobile devices 130, 135, 136, and 140 can communicate with other components using voice communications or data communications (such as accessing content from a website). Mobile devices 130, 135, 136, and 140 include devices equipped for cellular communication through PLMN 120, devices equipped for Wi-Fi communications via wireless access points 125a or 125b, or dual-mode devices capable of both cellular and WLAN communications. Mobile devices 130, 135, 136, and 140 are described in detail below in FIG. 2.

Mobile devices 130, 135, 136, and 140 also include one or more radio transceivers and associated processing hardware and software to enable wireless communications with PLMN 120, and/or one of the WLANs via wireless access points 125a or 125b. In various embodiments, PLMN 120 and mobile devices 130, 135, 136, and 140 are configured to operate in compliance with any one or more of a number of wireless protocols, including GSM, GPRS, CDMA, EDGE, UMTS, EvDO, HSPA, or a variety of others. It will be appreciated that mobile devices 130, 135, 136, and 140 can roam within PLMN 120 and across PLMNs, in known manner, as their user moves. In some instances, dual-mode mobile devices 130, 135, 136, and 140 and/or enterprise network 105 are configured to facilitate roaming between PLMN 120 and a wireless access points 125a or 125b, and are thus capable of seamlessly transferring sessions (such as voice calls) from a coupling with the cellular interface of dual-mode device (i.e., 130, 135, 136, and 140) to a WLAN interface of the dual-mode device, and vice versa.

In some embodiments, each mobile device possesses the ability to act as a mobile bridge. For example, mobile device 130 can act as a mobile bridge with mobile device 136. Generally, a conference call hosted using a mobile bridge will have a maximum of 3 participants. User controls at the mobile-bridge level include adding additional participants, muting the device user, un-muting the device user, and exiting the conference call. Additionally, the moderator can have additional controls not available to other conference users. For example, muting a particular conference participant. The particular user and moderator controls associated with the mobile bridge can vary depending on the type of mobile bridge used. Additionally, the particular user and moderator controls available can vary depending on whether the conference is an audio conference, a video conference, or a combination thereof.

Enterprise network 105 typically includes a number of networked servers, computers, and other devices. For example, enterprise network 105 can couple one or more desktop or laptop computers 143 (one shown). The coupling can be wired or wireless in some embodiments, Enterprise network 105 can also couple to one or more digital telephone phones 160.

Relay 125 serves to route messages received over PLMN 120 from mobile device 130 to corresponding enterprise network 105. Relay 125 also pushes messages from enterprise network 105 to mobile device 130 via PLMN 120.

Enterprise network 105 also includes an enterprise server 150. Together with relay 125, enterprise server 150 functions to redirect or relay incoming e-mail messages addressed to a user's e-mail address through enterprise network 105 to mobile device 130 and to relay incoming e-mail messages composed and sent via mobile device 130 out to the intended recipients within WAN 115 or elsewhere. Enterprise server 150 and relay 125 together facilitate a "push" e-mail service for mobile device 130, enabling the user to send and receive e-mail messages using mobile device 130 as though the user were coupled to an e-mail client within enterprise network 105 using the user's enterprise-related e-mail address, for example on computer 143.

As is typical in many enterprises, enterprise network 105 includes a Private Branch eXchange (although in various embodiments the PBX can be a standard PBX or an IP-PBX, for simplicity the description below uses the term PBX to refer to both) 127 having a coupling with PSTN 128 for routing incoming and outgoing voice calls for the enterprise. PBX 127 is coupled to PSTN 128 via DID trunks or PRI trunks, for example. PBX 127 can use ISDN signaling protocols for setting up and tearing down circuit-switched couplings through PSTN 128 and related signaling and communications. In some embodiments, PBX 127 can be coupled to one or more conventional analog telephones 129. PBX 127 is also coupled to enterprise network 105 and, through it, to telephone terminal devices, such as digital telephone sets 160, softphones operating on computers 143, etc. Within the enterprise, each individual can have an associated extension number, sometimes referred to as a PNP (private numbering plan), or direct dial phone number. Calls outgoing from PBX 127 to PSTN 128 or incoming from PSTN 128 to PBX 127 are typically circuit-switched calls. Within the enterprise, for example, between PBX 127 and terminal devices, voice calls are often packet-switched calls, for example Voice-over-IP (VoIP) calls.

System 100 includes one or more conference bridges 132. Conference bridge 132 can be part of enterprise network 105. Additionally, in some embodiments, conference bridge 132 can be accessed via WAN 115 or PSTN 128. Additionally, in some embodiments, conference bridge 132 can be accessed via foreign PSTN 128B, through dial-in numbers that are local to foreign PSTN 128B. Foreign PSTN 128B represents the Public Switched Telephone Network in a foreign country. Foreign PSTN 128B is connected to PSTN 128 through any of a variety of international access channels (or "international links"), including but not limited to geosynchronous satellites, submarine cables, low-earth orbit satellites, and any other system that enables international and/or intercontinental communications (not shown). There can be different dial-in numbers for each country to access the same conference bridge, to enable a foreign phone 129 (and other similar devices) to participate in the conference. Foreign phone 129 would typically connect through foreign PSTN 128B, using one of these different dial-in numbers, to conference bridge 132 through the aforementioned international links (not shown).

Enterprise network 105 can further include a Service Management Platform (SMP) 165 for performing some aspects of messaging or session control, like call control and advanced call processing features. Service Management Platform (SMP) can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. SMP 165 is configured to couple different conference systems to create a heterogeneous conference, for example, a single teleconference, where participants can be joined to the conference via a mobile bridge and an intermediate conference server.

Mobile conferencing system 300 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Mobile conferencing system 300 can be implemented on a mobile device, a single computer, distributed across a plurality of computers, or some combination thereof.

Figure 2:
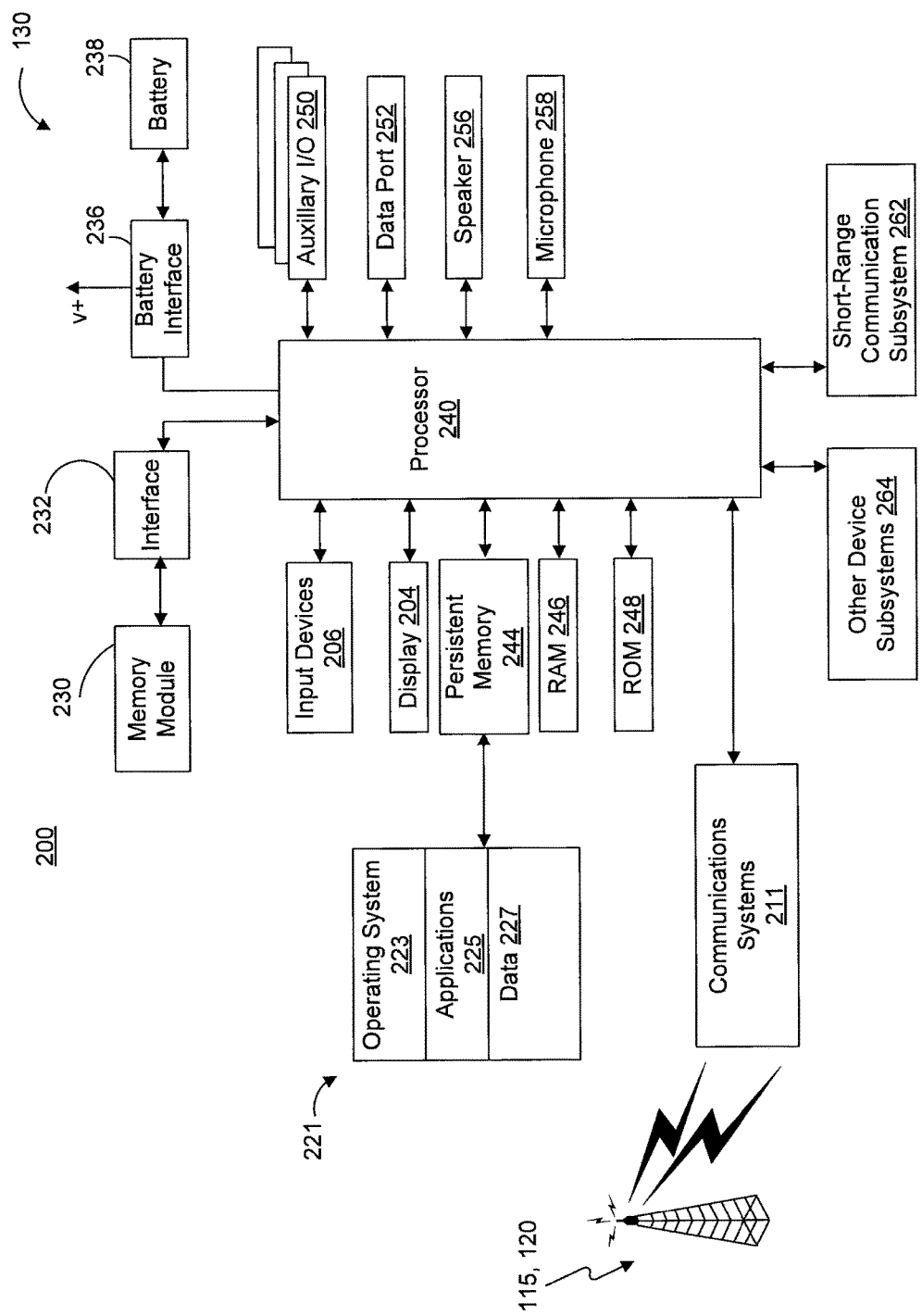
FIG. 2 shows a block diagram illustrating a mobile device in accordance with an example embodiment.

Reference is now made to FIG. 2 which illustrates in detail mobile device 130 in which example embodiments can be applied. Note that while FIG. 2 is described in reference to mobile device 130, it also applies to mobile devices 135, 136, and 140. Mobile device 130 is a two-way communication device having data and voice communication capabilities, and the capability to communicate with other computer systems, for example, via the Internet. Depending on the functionality provided by mobile device 130, in various embodiments mobile device 130 can be a handheld device, a multiple-mode communication device configured for both data and voice communication, a smartphone, a mobile telephone, a tablet, or a PDA (personal digital assistant) enabled for wireless communication.

Mobile device 130 includes a rigid case (not shown) housing the components of mobile device 130. The internal components of mobile device 130 can, for example, be constructed on a printed circuit board (PCB). The description of mobile device 130 herein mentions a number of specific components and subsystems. Although these components and subsystems can be realized as discrete elements, the functions of the components and subsystems can also be realized by integrating, combining, or packaging one or more elements in any suitable fashion.

Mobile device 130 includes a controller comprising at least one processor 240 (such as a microprocessor), which controls the overall operation of mobile device 130. Processor 240 interacts with device subsystems such as a communication systems 211 for exchanging radio frequency signals with the wireless network (for example. WAN 115 and/or PLMN 120) to perform communication functions. Processor 240 interacts with additional device subsystems including a display 204 such as a liquid crystal display (LCD) screen or any other appropriate display, input devices 206 such as a keyboard, control buttons, a trackball, a trackpad, a trackwheel/thumbwheel/scroll wheel, or the like, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which can employ any appropriate wireless (for example, RF or BLUETOOTH), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device and processor 240 interacts with the touch-sensitive overlay via the electronic controller. In other embodiments, display 204 can be implemented as a non-touch-screen display, in that input can be delivered to the device using a pointing or navigational tool, a trackball, a trackpad, a keyboard, a trackwheel/thumbwheel/scroll wheel, or the like.

Communication systems 211 includes one or more communication systems for communicating with wireless WAN 115 and wireless access points 125*a* and 125*b* within the wireless network. The particular design of communication systems 211 depends on the wireless network in which mobile device 130 is intended to operate. Mobile device 130 can send and receive communication signals over the wireless network after any required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions, or both. In some embodiments, persistent memory 244 is rewritable under control of processor 240, and can be realized using any appropriate persistent memory technology, including EEPROM, EAROM, FLASH, or the like. As illustrated in FIG. 2, software modules 221 can include operating system software 223. Additionally, software modules 221 can include software applications 225 and data 227.

In some embodiments, persistent memory 244 stores user-profile information, including, one or more conference dial-in numbers. Persistent memory 244 can additionally store identifiers related to particular conferences. Persistent memory 244 can also store information relating to various people, for example, name of a user, a user's identifier (user name, email address, or any other identifier), place of employment, work phone number, home address, etc. Additionally, persistent 244 memory can additionally store conference details parsed from one or more calendar events. Conference details can include, for example, conference subject information, conference dial-in number, date/time of call, and addressee information In some embodiments, persistent memory 244 can store a look up table that mobile conferencing system 300 can reference to determine what user controls are associated with a particular conference dial-in number.

Software modules 221, for example, mobile conferencing system 300, or parts thereof can be temporarily loaded into volatile memory such as RAM 246. RAM 246 is used for storing runtime data variables and other types of data or information. In some embodiments, different assignment of functions to the types of memory could also be used.

Software applications 225 can further include a range of applications, including, for example, an application related to mobile conferencing system 300, an e-mail messaging application, an address book, a calendar application, a dialer application, a notepad application, an Internet browser application, a voice communication (i.e., telephony) application, a mapping application, or a media player application, or any combination thereof. Each of software applications 225 can include layout information defining the placement of particular fields and graphic elements (for example, text fields, input fields, icons, etc.) in the user interface (i.e., display 204) according to the application.

In some embodiments, auxiliary input/output (I/O) subsystems 250 comprise an external communication link or interface, for example, an Ethernet connection. In some embodiments, auxiliary I/O subsystems 250 can further comprise one or more input devices, including a pointing or navigational tool, or one or more output devices, including a mechanical transducer such as a vibrator for providing vibratory notifications in response to various events on mobile device 130 (for example, receipt of an electronic message or incoming phone call), or for other purposes such as haptic feedback (touch feedback).

In some embodiments, mobile device 130 also includes one or more removable memory modules 230 (typically comprising FLASH memory) and one or more memory module interfaces 232. Among possible functions of removable memory module 230 is to store information to augment interoperability between device control system 400 and different types of conference hosting systems. For example, memory modules 230 can contain one or more command translation programs. Another possible function of removable memory module 230 is to store information used to identify or authenticate a user or the user's account to wireless network (for example WAN 115 and/or PLMN 120). For example, in conjunction with certain types of wireless networks, including GSM and successor networks, removable memory module 230 is referred to as a Subscriber Identity Module or SIM. Memory module 230 is inserted in or coupled to memory module interface 232 of mobile device 130 in order to operate in conjunction with the wireless network.

Mobile device 130 stores data 227 in persistent memory 244. In various embodiments, data 227 includes service data comprising information required by mobile device 130 to establish and maintain communication with the wireless network (for example WAN 115 and/or PLMN 120). Data 227 can also include, for example, scheduling and connection information for connecting to a scheduled call. Data 227 can include device control system data used by mobile device 130 for various tasks. For example, to automatically dial a conference, to identify user controls associated with a particular conference hosting system, to classify a call type parameter, to execute user controls (for example, add participants to a conference call, etc.), to provide moderator control over a conference call to mobile device 130 when mobile device 130 acts as a moderator device, to provide one or more controls to a user of mobile device 130 when participating in a conference call, to provide conference details to the calendaring application, to provide conference details to the dialer application, etc.

Mobile device 130 also includes a battery 238 which furnishes energy for operating mobile device 130. Battery 238 can be coupled to the electrical circuitry of mobile device 130 through a battery interface 236, which can manage such functions as charging battery 238 from an external power source (not shown) and the distribution of energy to various loads within or coupled to mobile device 130. Short-range communication subsystem 262 is an additional optional component which provides for communication between mobile device 130 and different systems or devices, which need not necessarily be similar devices. For example, short-range communication subsystem 262 can include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications can be installed on mobile device 130 during or after manufacture. Additional applications and/or upgrades to operating system software 223 or software applications 225 can also be loaded onto mobile device 130 through the wireless network (for example WAN 115 and/or PLMN 120), auxiliary I/O subsystem 250, data port 252, short-range communication subsystem 262, or other suitable subsystem such as 264. The downloaded programs or code modules can be permanently installed, for example, written into the program memory (for example persistent memory 244), or written into and executed from RAM 246 for execution by processor 240 at runtime.

Mobile device 130 can provide three principal modes of communication: a data communication mode, a voice communication mode, and a video communication mode. In the data communication mode, a received data signal such as a text message, an e-mail message, Web page download, or an image file are processed by communication systems 211 and input to processor 240 for further processing. For example, a downloaded Web page can be further processed by a browser application, or an e-mail message can be processed by an e-mail message messaging application and output to display 204. A user of mobile device 130 can also compose data items, such as e-mail messages, for example, using the input devices in conjunction with display 204. These composed items can be transmitted through communication systems 211 over the wireless network (for example WAN 115 and/or PLMN 120). In the voice communication mode, mobile device 130 provides telephony functions and operates as a typical cellular phone. In the video communication mode, mobile device 130 provides video telephony functions and operates as a video teleconference term. In the video communication mode, mobile device 130 utilizes one or more cameras (not shown) to capture video of video teleconference. Additionally, in some embodiments, mobile device 130 utilizes the one or more cameras to capture video. The video can be stored as one or more video data files in persistent memory 244, RAM 248, memory module 230, or any other data storage medium.

Referring back to FIG. 1, collectively SMP 165, conference bridge 132, and PBX 127 is referred to as the enterprise communications platform, generally designated 180. It will be appreciated that enterprise communications platform 180 and, in particular, SMP 165, is implemented on one or more servers having suitable communications interfaces for coupling to and communicating with PBX 127, conference bridge 132 and DID/PRI trunks. Although SMP 165 can be implemented on a stand-alone server, it will be appreciated that it can be implemented into an existing control agent/server as a logical software component.

Mobile device 130 includes mobile conferencing system 300 and is in communication with enterprise network 105. In some example embodiments, mobile conferencing system 300 also operates on mobile devices 135, 136, and 140, computers 142 and 143, digital phone 160, or any variation thereof. In some embodiments, mobile conferencing system 300 is in communication with and operates as part of a conference call program installed on mobile devices 130, 135, 136, and 140, and other servers on enterprise network 105, for example, SMP 165. Additionally, in some embodiments, mobile conferencing system 300 is integral to the conference call program. Mobile conferencing system 300 interfaces with a calendaring application (not shown) and a dialer application (not shown). The calendaring and dialer application operate, at least in part, on mobile device 130. In some embodiments, mobile conferencing system 300 is integral to one or both of the calendaring application and the dialer application.

Figure 3:
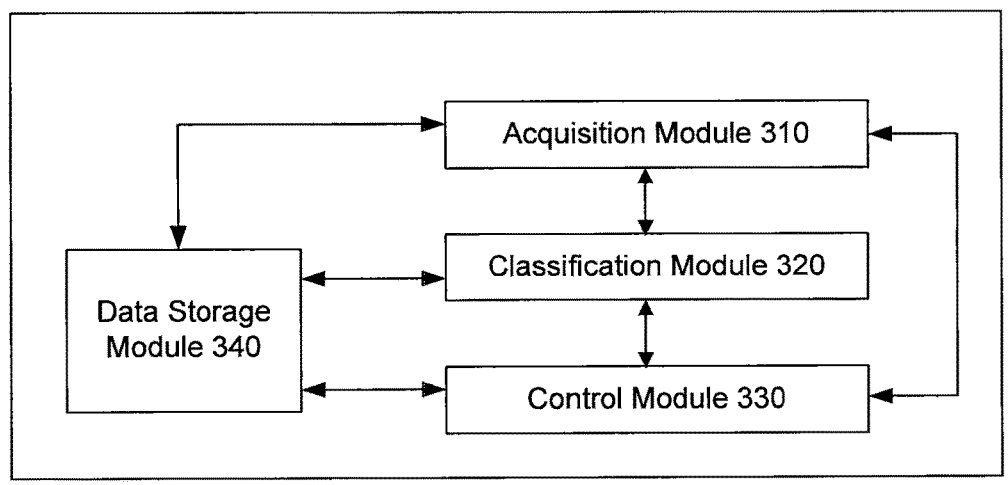
FIG. 3 is a block diagram depicting an example mobile conferencing system for connecting to a teleconference and displaying relevant information.

FIG. 3 is a block diagram depicting example mobile conferencing system 300. As illustrated, mobile conferencing system 300 includes an acquisition module 310, a classification module 320, a control module 330, and a data storage module 340. It is appreciated that one or more of these modules can be deleted, modified, or combined together with other modules.

Acquisition module 310 interfaces with a calendaring application to parse information from a calendar event scheduled within a calendaring application. In some embodiments, acquisition module 310 can be automatically executed when a user accepts a calendar invitation, the user receives a calendar invitation, the user enters a new calendar event, the user updates an existing calendar event, or the like. In some embodiments, acquisition module 310 can also be automatically executed when parsing a calendar invitation, calendar event, a communication (as will be described later with reference to FIG. 5), or the like. Calendar invitations include, for example, invitations to participate in a teleconference. Acquisition module 310 is configured to automatically parse the calendar event for conference details including, for example, dialing details, subject matter information, conference scheduling information, and calendar invitation addressee information. Dialing details include conference dial-in phone number, participant passcode, extension, moderator passcode, etc. Conference scheduling information includes the date and time of the conference. Acquisition module 310 can be coupled to classification module 320, control module 330, and data storage module 340.

Classification module 320, analyzes the parsed information to determine if conference call details are present in the parsed information. For example, classification module can be configured to analyze the parsed information for keywords and phrases like "teleconference," "conference," "phone conference," "John Doe has invited you to join the conference," etc. Additionally, classification module 320 can be further configured to analyze the parsed information for conference dial-in phone numbers, extensions to the conference dial-in numbers, conference passcodes, and moderator passcodes. Classification module 320 makes a determination based on the analyzed information whether the parsed information contains conference call details. For example, classification module 320 can be configured to match phone numbers parsed from the calendar event against numbers stored in data storage module 340 to determine if the phone numbers are dial-in numbers.

Additionally, in some embodiments, classification module 320 can be configured to analyze the number of addressees on the calendar invitation that created the calendar event. Classification module 320 is also configured to analyze information directly dialed by the user of mobile device 300 for conference dial-in numbers, extensions to the conference dial-in numbers, conference passcodes, and moderator passcodes. Classification module 320 makes a determination based on the analyzed information whether the direct dial in information contains conference call details. If classification module 320 determines conference details are present, mobile conferencing system 300 sets a call type parameter associated with the calendar event as being a "conference call." Additionally, classification module 320 then stores the conference details, using for example, data storage module 340. If no conference details are present, mobile conferencing system 300 stops processing the parsed information. Classification module 320 can be coupled to acquisition module 310, control module 330, and data storage module 340. Additionally, in some embodiments, Classification module 320 is able to determine the appropriate number to dial in order to join the teleconference, based on any of the current geographic location of the device, the home country or home network of the device, user-set preferences (in some embodiments, including a typical location of the mobile device), carrier-set preferences, teleconference provider-set preferences, past actions, current mobile network, past mobile network(s), current home mobile network (as determined by, e.g. the carrier associated with the Subscriber Identity Module (SIM)), or the like.

Control module 330 monitors the calendaring application for the arrival of the date/time associated with the calendar event. In some embodiments, control module 330 is configured to provide at a predetermined time (for example, 15 minutes prior to conference) the conference details to the calendaring application. The mobile device prompts the user at the predetermined time to enter the conference at the scheduled conference time. The prompt can be an audio prompt, or a visual prompt (for example, a "join now" or "dial now" button), or both, all of which requesting an input to accept or decline joining the conference at the scheduled time. Additionally, the prompt can display information from the conference details, for example, the conference subject information and conference dial-in number. When the join now button is selected, a join conference command is generated by control module 330, the dialer application, the calendaring application, or some combination thereof. In some embodiments, the join conference command can also be generated via a voice command. In some embodiments, the mobile device can automatically join the conference without a specific prompt to the user.

Control module 330 is configured to provide the stored conference details to a dialer application along with the call type parameter. For example, control module 330 can provide a stored conference dial-in number, participant passcode, moderator passcode, or some combination thereof, to the dialer application. The dialer application can then use the received conference details to automatically dial into the conference or establish a new conference. In some embodiments, the dialer application is configured to dial into a conference using voice commands, specifically a calling name, from the user. In particular, the dialer application can be configured to use the conference subject information as the calling name.

In some embodiments, the dialer application is executed by the actuation of a "join now" button on a prompt provided by the calendaring application. The dialer application is separate from mobile conferencing system 300. Additionally, in some embodiments (not shown), the dialer application can be part of mobile conference system 300 (for example, control module 330).

The dialer application, in some embodiments, generates an active call graphical user interface for the duration of the conference call. Mobile device 300 is configured to display conference details on the active call graphical user interface.

For example, active call window graphical user interface can display the subject information of the teleconference and the conference dial in number.

Also in FIG. 3, data storage module 340 can also include a database, one or more computer files in a directory structure, or any other appropriate data storage mechanism such as a memory. Data storage module 340 stores, for example, conference details from one or more calendar events, user profile information, information relating to various people, and controls specific to different types of conference hosting systems and an associated controls lookup table. Parsed information can include, for example, conference dialing details, subject matter information, conference scheduling information, and calendar invitation addressee information. User profile information can include, for example, one or more conference dial-in numbers. Information relating to various people can include, for example, name, place of employment, work phone number, home address, etc. Data storage module 340 can include controls specific to particular types of conference hosting systems. Additionally, data storage module 340 can include a controls lookup table, which mobile conferencing system 300 can use to determine what type of conference controls are available based on the conference dial in number. In some example embodiments, data storage module 340 is distributed across one or more network servers. Data storage module 340 can communicate with acquisition module 310, classification module 320, and control module 330. Data storage module 340 can also store information pertaining to alternate teleconference dial-in numbers, teleconference dial-in number preferences, the current or home locations for the device, or the like.

Each of modules 310, 320, 330, and 340 can be software programs stored in a RAM, a ROM, a PROM, a FPROM, or other dynamic storage devices, or persistent memory for storing information and instructions.

Figure 4:
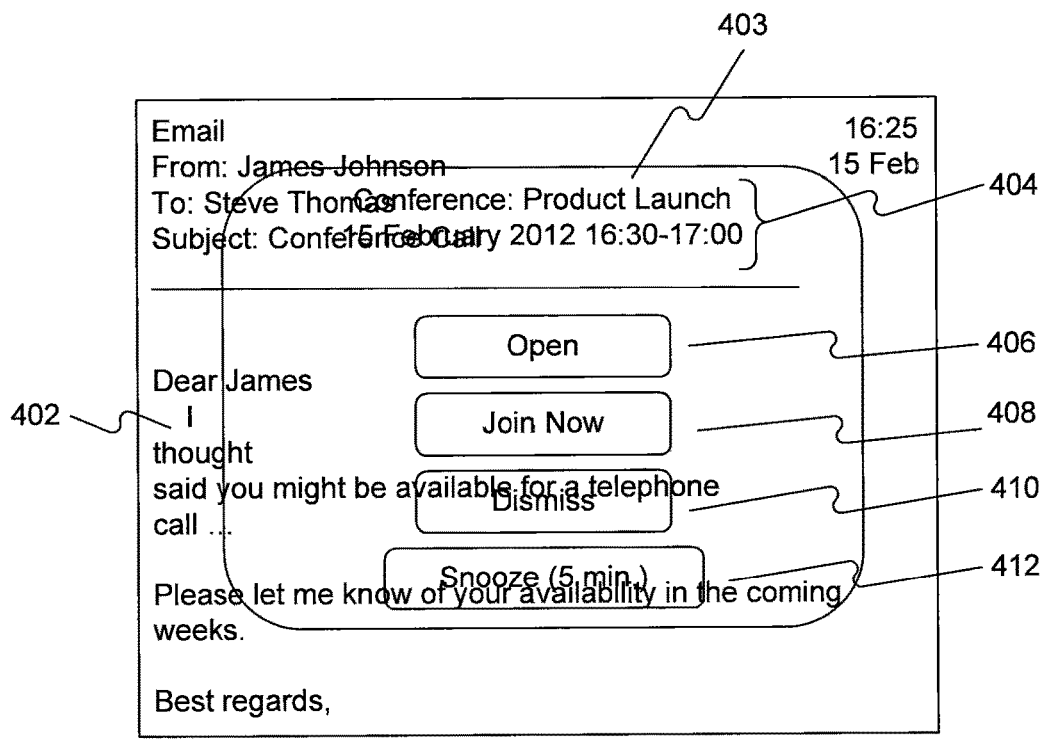
FIG. 4 shows an example user interface for displaying output and receiving input.

FIG. 4 shows an example user interface 400 for displaying output and receiving input. User interface 400 is used to display information on a device, such as mobile device 130, and to receive input on mobile device 130 as well. User interface 400 is ideally displayed on Display 204, implemented as a touch-screen device. A user could either touch the screen to interact with the device (using a stylus, finger, or other implement) or press buttons to interact with the device (such as a trackball, trackpad, or keyboard). In some embodiments, user interface 400 can be displayed on Display 204, implemented as a non-touch-screen device, such that users would need to use said buttons to interact with the device.

User interface 400 shows Background 402. In the example of user interface 400, an electronic mail message was being displayed on user interface 400 as Background 402 when pop-up reminder interface 403, being activated and displayed by a calendar application (as previously described with respect to FIG. 3), is displayed as an overlay of the electronic mail message. However, in some embodiments, pop-up reminder interface 403 can display in such a way as to completely cover Background 402. In other embodiments, pop-up reminder interface 403 can display in such a way as to minimize the coverage of Background 402.

In any case, pop-up reminder interface 403 displays information about an upcoming teleconference that the device is apprised of. This information, for example, could be from communication 500 (as will be later described with reference to FIG. 5).

In some embodiments, pop-up reminder interface 403 displays Conference Information 404. This information includes, for example, the name/title of the teleconference, the date and time of the conference, and optionally the location or dial-in numbers for the conference. Buttons 406, 408, 410, 411, and 412 are displayed to enable access and modification of the conference details. Button 406 enables a user to display (or "Open") the details for the conference. In some embodiments, the details, as will be made further clear in FIG. 5 below, comprise users requested or required to join the conference, the date and time of the conference, what will be discussed during the conference, dial-in numbers and/or access codes for accessing the conference, websites for accessing the conference on a computer, information about other dial-in numbers or methods, or the like.

Button 408 is displayed to enable the user to join the conference. When this button is actuated, the device will, in some embodiments, dial a phone number stored in the communication (as explained later with reference to FIGS. 5 and 6C) along with any necessary access codes. In some embodiments, this button will, as will be explained later with reference to FIGS. 6A and 6B, be used to determine alternate dial-in numbers for dialing into the conference, and then dial into the conference.

Button 410 enables a user to dismiss the pop-up reminder interface 403. This will prevent pop-up reminder interface 403 from appearing again. In some embodiments, the user is prompted at a later time, such as at the beginning of the conference.

Button 412 enables a user to snooze—or delay—pop-up reminder interface 403 for a certain amount of time. This would enable pop-up reminder interface 403 to appear at a different time, reminding the user again that the conference is about to begin and prompting him to join. In example user interface 400, this amount of time is set to 5 minutes, but, in other embodiments, any amount of time can be used as a delay.

Figure 5:
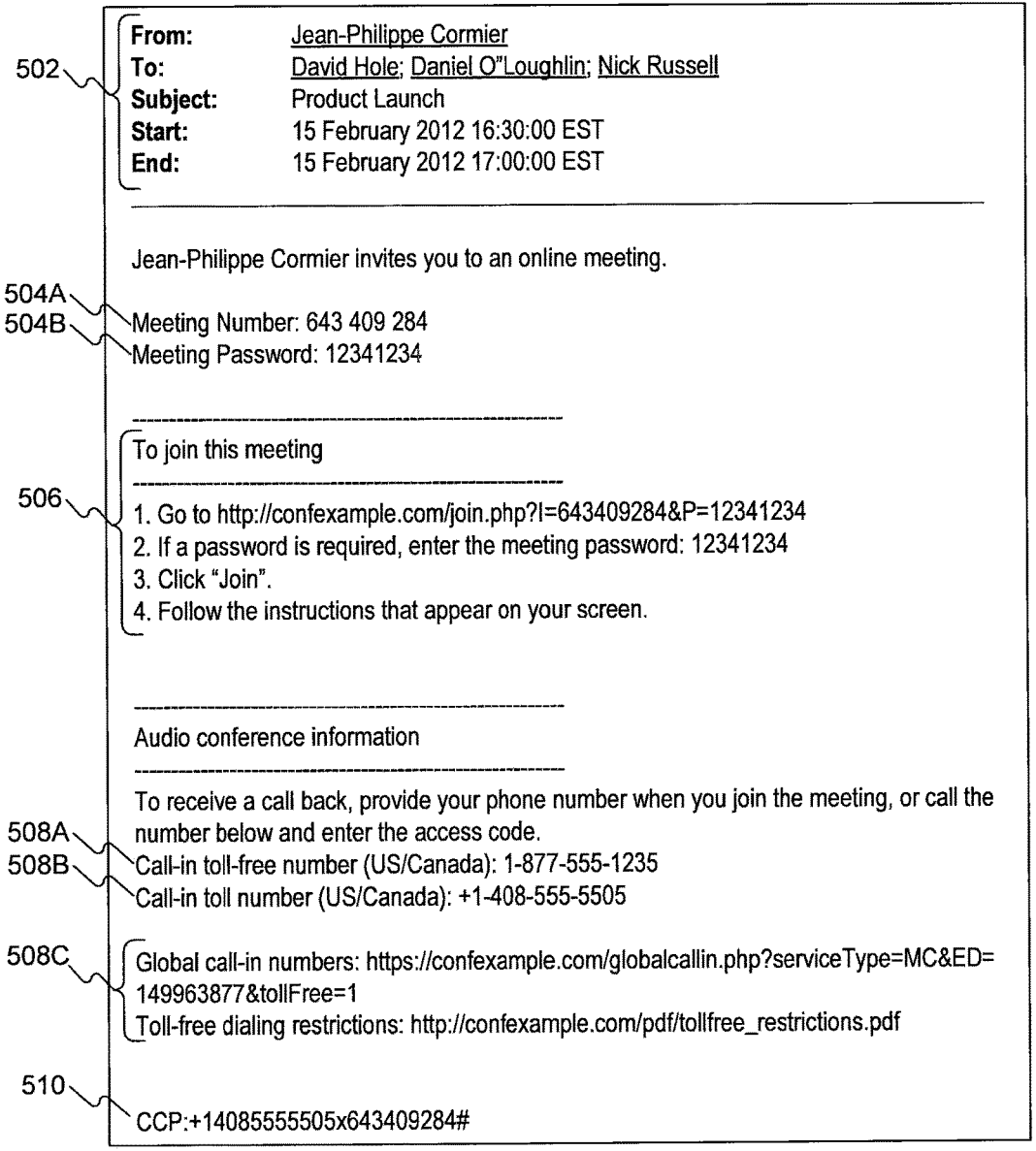
FIG. 5 is an example of a communication for initiating a teleconference between users.

Referring to FIG. 5, a communication 500 is shown. Communication 500, in some embodiments, is implemented as an electronic mail message. In some embodiments, communication 500 can be implemented as a Short Messaging Service (SMS) message, a Multimedia Messaging Service (MMS) message, a message on an instant messaging system (such as BLACKBERRY MESSENGER or GOOGLE TALK), a calendar event, a meeting invite, or the like. Communication 500 includes, in some embodiments, Conference Information 502, which includes the sender of communication 500, the recipients of communication 500, the subject of the teleconference referenced in communication 500, the start and end times for the teleconference, or the like. Communication 500 also, in some embodiments, includes meeting number 504A and meeting password 504B. Meeting number 504A is used to identify the unique conference that will be held between these individuals. That is, because teleconference providers regularly conduct multiple teleconferences using the same system at the same time, a code is needed to uniquely identify each teleconference. Additionally, to promote a more secure teleconferencing platform, users can be required to enter meeting password 504B in order to participate in a teleconference. This enables sensitive company conversations to take place during the teleconference, because only those authorized to listen in on the meeting will be able to join the teleconference. On a typical teleconference system, a user would enter meeting number 504A followed by meeting password 504B; if both are verified by the system, the user will be granted access to the teleconference. This enables both unique teleconferencing capabilities as well as secure teleconferencing. However, neither meeting password 504B nor meeting number 504A are required in all embodiments; in some embodiments, all that is required to join a conference is dialing a dial-in number.

Communication 500, in some embodiments, contains webaccess information 506. Webaccess information 506 contains, in some embodiments, a Uniform Resource Locator (URL) (or other network link—for example, a URL for a proprietary teleconferencing system, an H.323 address, a "callto" URL, or the like) and information on how to use that link to access the teleconference from a personal computer. In some embodiments, meeting number 504A and meeting password 504B would be a portion of the URL so that, when clicked or otherwise accessed by a user, the device would automatically join the conference.

Communication 500, in some embodiments, also contains information on dial-in numbers that can be used to access the conference. At least one toll-free number 508A can be included with communication 500; these types of numbers typically do not cost the calling party for making the call (though carrier charges, cellphone minutes, and other charges may apply). However, these numbers are not available from all telephone systems. For example, "800 numbers" in the U.S. and Canada may not be accessible outside of those two countries. If these numbers are accessible outside of the U.S. and Canada, they may not be free to the dialing party. Additionally, some 800 numbers are not accessible from payphones. Thus, Communication 500 can, in some embodiments, include at least one Toll number 508B. Toll numbers 508B typically could be accessed from any phone, though at a potential cost (usually a per-minute fee in addition to any connection fee) to the dialing party.

In some embodiments, both toll-free number 508A and toll number 508B are located in the same country. Thus, it may be expensive for a user located in another country to dial into the teleconference given only toll-free number 508A and toll number 508B, because of international long-distance charges. Communication 500, in some embodiments, contains links 508C. Links 508C, in some embodiments, contain a link to a list of global call-in numbers. The numbers on the list enable users in different countries to call local numbers that will cost less than would an international call of a similar length. These numbers enable access to the same teleconference provider that users in other countries are able to access through any of toll-free number 508A or toll number 508B. This could be accomplished, for example, using foreign PSTN 128B that has a connection to conference bridge 132 (see FIG. 1).

In some embodiments, Link 508C contains a link to a list of dialing restrictions. That is, countries may have different restrictions on how toll-free numbers (even local toll-free numbers) may be dialed. For example, some toll-free numbers may only be dialed from home phones (and not from payphones or mobile phones, for example). Information in this list may be useful to a user trying to dial a toll-free number from another country.

In some embodiments, the information contained in communication 500—that is, information including at least Meeting Number 504A, Meeting Password 504B, webaccess information 506, toll-free number 508A, toll number 508B, Link 508C, or access string 510—can be parsed by mobile device 130 (as will later be described with reference to FIGS. 6A and 6B) in order to choose and dial the proper number for accessing a teleconference.

Figure 6A:
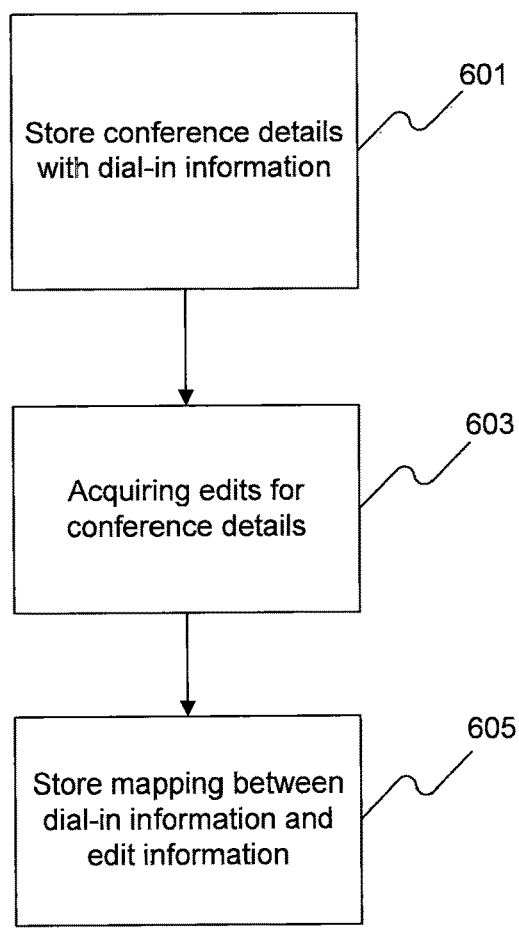
FIG. 6A is an example of a portion of a method for creating a mapping between a dial-in number and an alternate dial-in number.

Moving to FIG. 6A, a method 600A is disclosed for storing information concerning teleconference dial-in information. In block 601, method steps are represented by which conference details are acquired. These details are acquired from, for example, communication 500 as in FIG. 5, but can realistically be acquired from any type of communication, including manual entry, Short Messaging Service (SMS) messages, Multimedia Messaging Service (MMS) messages, or the like. In some embodiments, these details comprise dial-in numbers, teleconference provider information, or the like. In some embodiments, these details are stored in the mobile device 130 or in enterprise server 150, for example in a database or in memory.

Block 603 represents another step in method 600A. Block 603 represents steps that occur in acquiring edits to the stored conference details acquired in block 601. In some embodiments, these edits are acquired by any of accessing a file local to mobile device 130, accessing a file located on a remote system, sending a request to a remote system, accessing or sending a request to a system such as the BlackBerry Enterprise Server or other groupware-provisioning system that provides information to mobile devices, receiving entry on the device, accessing a file included in communication 500, accessing information in communication 500, or the like. The process represented by block 603 can be manual, in that a user must manually request and/or find and enter a different dial-in number. However, in some embodiments, the process is automatic. An example of an automatic process would involve determining the device's home location, based in part on information stored in the phone. This information could, in some embodiments, include information on the SIM/RUIM card or the phone itself (such as carrier identification, the International Mobile Subscriber Identity (IMSI), the Integrated Circuit Card Identifier (ICCID), the Mobile Country Code (MCC), or the like). The automatic process, in some embodiments, could then determine that this information does not match the current physical location of the phone (determined e.g. by triangulation, Global Positioning Satellite systems, Assisted GPS (aGPS), the MCC of the current serving network, or the like) and determine that another number is required, based on "attributes" such as the above-mentioned determinations of location, home network or current network of the device, or the like. The different dial-in number is also known as a "replacement conference call phone number."

Once the edits are acquired in block 603, the method can begin executing steps represented by block 605. Block 605 represents storing a "mapping" (i.e., a "relationship" or "association") between the edits acquired in the steps in block 603 and the dial-in information received in the steps in block 601. This has the effect of associating the two numbers together for later use. This association can be accomplished in any method known in the prior art, comprising at least one of: storage in a relational database, storage in a flat database, storage in a hierarchical database, storage in an object-oriented database, storage on mobile device 130 (including, for example, storage in Memory Module 130, Data 227, or RAM 246), storage on a remote device, or the like. In some embodiments, this mapping may be implemented as will be later described with respect to FIG. 7.

Figure 6B:
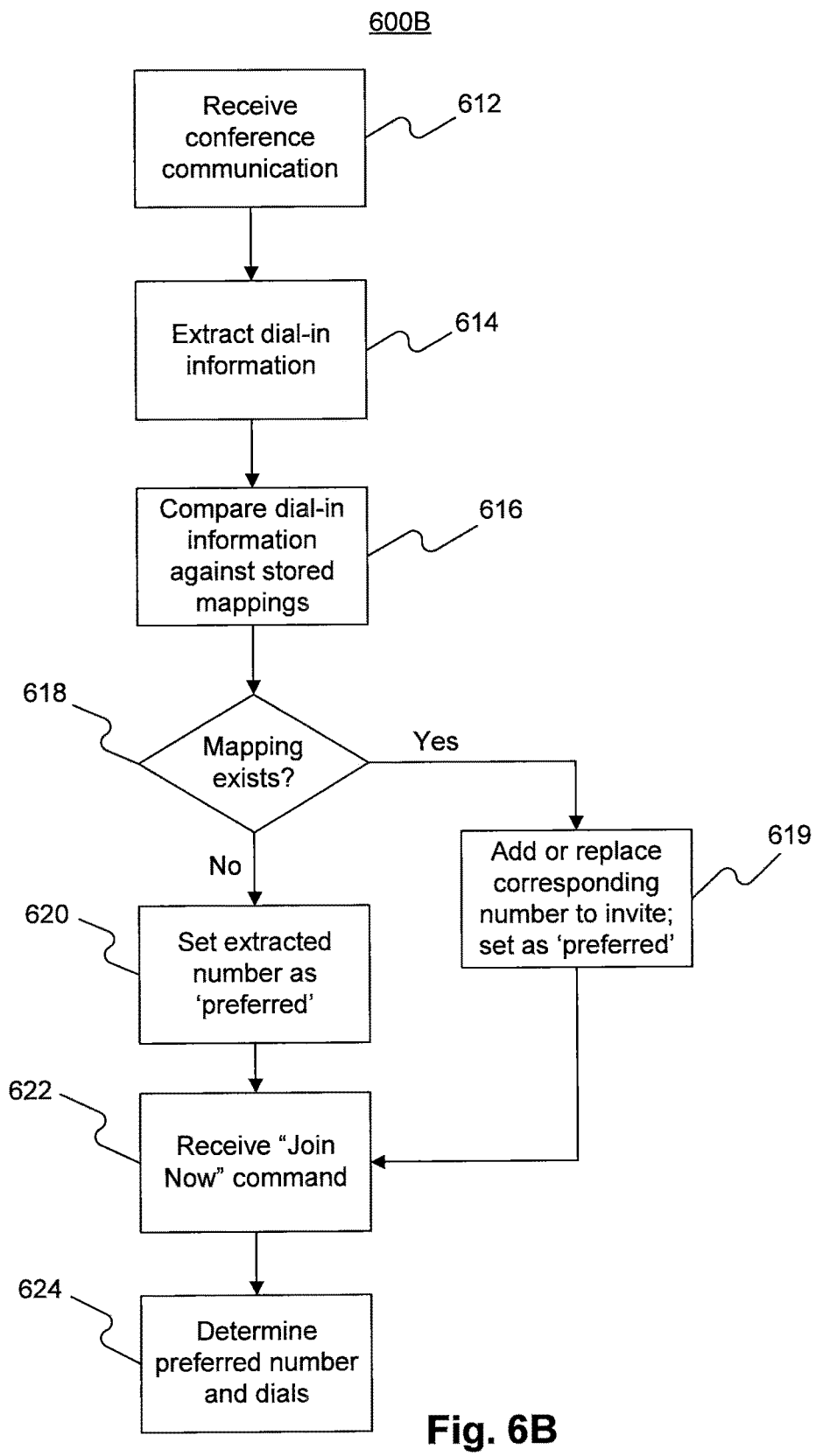
FIG. 6B is an example of a portion of a method for choosing one of a dial-in number or an associated dial-in number and dialing the chosen number.

At some point after the steps in FIG. 6A are executed, the steps represented by FIG. 6B can be executed. In FIG. 6B, a method 600B is represented for choosing one of a dial-in number or an associated dial-in number and dialing the chosen number. Beginning with block 612, steps are undertaken by which a user receives a conference communication, such as communication 500. Receipt of communication 500 can be done using any of Communications Subsystems 211, Other Device Subsystems 264, Short-Range Communication Subsystems 262, or the like. Moving to block 614, the method will then extract the dial-in information (such as the number to call and/or the access code) from the received communication. In some embodiments, extracting this information is performed by parsing the received communication; the method will know in advance that each communication follows a particular template for its information, and will parse the communication appropriately. In other embodiments, a smarter system is used to parse the received communication to determine the relevant information. For example, the method could look for the phrase "call me at" or "number to dial" and determine that the digits following that phrase constitute the number that a user should call. These methods are known in the art. In some embodiments, the dial-in information extracted in block 614 comprises a name of or other information about the teleconference provider. For example, the method may extract the term "WebEx," "Teleconference Providers, Inc.," or "www.Tele-conferences-R-Us.com" from the communication received in block 612. In some embodiments, the name of or other information about the teleconference provider signifies the entity that runs the teleconference referenced in the communication.

Method 600B can then proceed to block 616, to execute steps that will compare the extracted dial-in information to pre-stored phone numbers. In some embodiments, these pre-stored phone numbers are created based on the acquired edits (as previously described with respect to at least blocks 603 and 605 of FIG. 6A). If a mapping exists between the dial-in information extracted in block 614 and one of the pre-stored phone numbers, then the method will continue to block 619. In block 619, steps will be executed to add or replace a phone number in the communication or to otherwise associate the pre-stored number for "replacement number") with the communication, teleconference, or meeting. In some embodiments, the steps in block 619 will set the pre-stored number to be a "preferred" number for that particular teleconference dial-in number, for example, while in the particular location that the device is currently in.

If no mapping is determined to exist in block 618, the method moves to block 620. In block 620, an original extracted phone number will be set as "preferred" because no mapping was found in the steps in block 618.

In any event, method 600B can eventually continue to block 622. In block 622, steps are performed by which the device receives a "Join Now" command. This command, in some embodiments, comes from a user that is using the device, when the user depresses a button (such as the "Enter" key or a trackpad) while a Join Now button is highlighted, touches an on-screen button (e.g., "Join Now") on a touch-screen display on the device, or from the device automatically attempting to join the conference at a specified time. Once the Join Now command is received, method 600B will continue to block 624.

In block 624, the device will determine which number is the preferred number, as set either by block 619 or block 620. The device will then dial that preferred number. In dialing that preferred number, the device can optionally dial any required access codes as well. The device can then join the conference without further user interaction, and the user will be able to interact with his colleagues or clients.

Figure 6C:
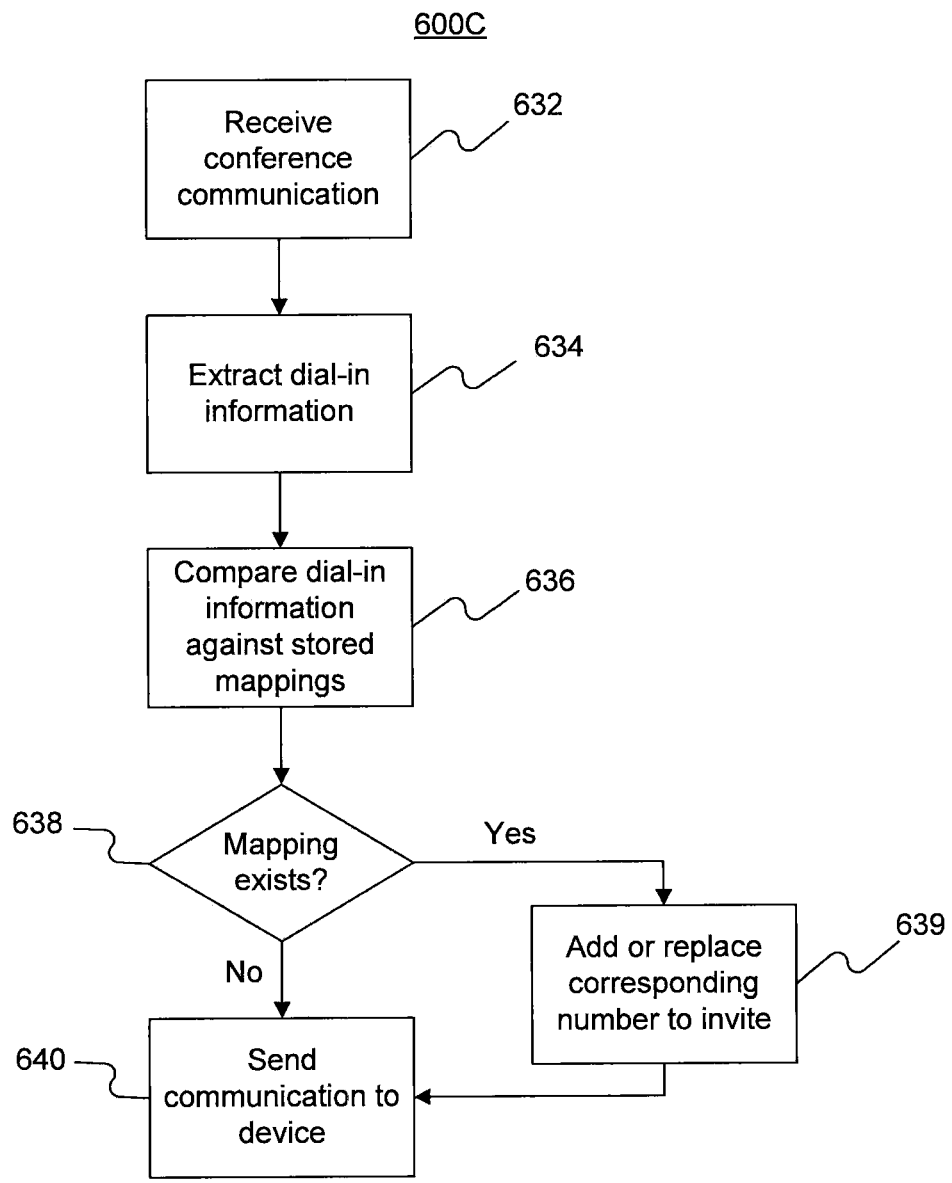
FIG. 6C is an example of a portion of a method for replacing a dial-in number in a communication.

FIG. 6C represents a method 600C for replacing a dial-in number in a communication. In some embodiments, method 600C is performed using a server, such as the BlackBerry Enterprise Server (BES) or other groupware-provisioning system that provides information to mobile devices. In some embodiments, the server may be implemented as enterprise server 150. In some embodiments, the steps in method 600C are performed before a communication is sent to a mobile device. For example, this can happen when the server receives a communication, such as an email, directed to a mobile device. After steps in method 600C are used to process and possibly modify the communication, the server can send the communication to the mobile device. Similar to FIG. 6B, steps in method 600C can be used to store a mapping between conference details and preferred dial-in numbers, and choosing the appropriate number to dial.

Beginning with block 632, steps are undertaken by which, for example, a server receives a conference communication, such as communication 500. Moving to block 634, method 600C can then extract dial-in information. As mentioned above with respect to FIG. 6B, the dial-in information in some embodiments, comprises dial-in numbers, access codes, the provider of the teleconference system, or the like. Method 600C can then proceed to block 636, to execute steps for comparing the extracted dial-in information to pre-stored phone numbers, as previously described with respect to block 616 in FIG. 6B. Moving to block 638, steps are undertaken in method 600C by which it is determined whether a mapping exists between the dial-in information extracted in block 634 and one of the pre-stored phone numbers. Steps associated with block 638 can be performed substantially as described above with respect to block 618. So, if it is determined that a mapping does exist, method 600C can proceed to block 639, where steps are executed to replace a phone number in the communication. In some embodiments, the steps in block 639 can occur based on determining where the mobile device is likely to be located. In some embodiments, the likely location of the mobile device can be determined by the server executing the steps in method 600C, based on location history, a current network, a user preference, a calendar event, or the like.

Whether a mapping is determined to exist in block 638 or not, method 600C proceed to block 640, where the communication is then sent on to the mobile device to which it was addressed.

Figure 7:
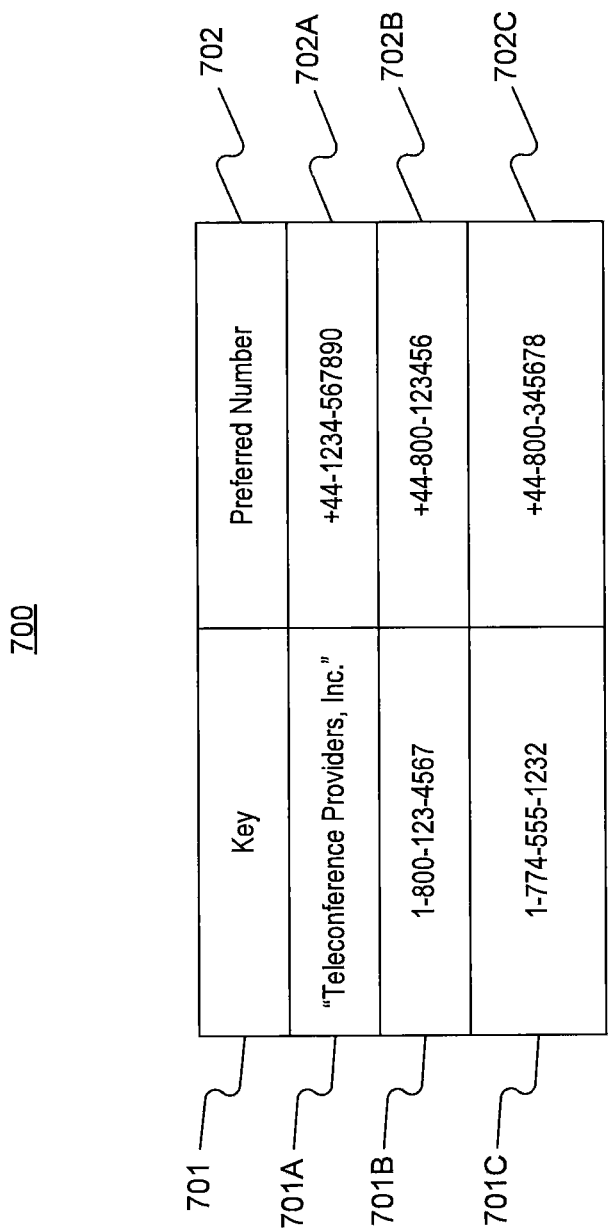
FIG. 7 is an example of a mapping storing replacement dial-in numbers.

FIG. 7 represents an example mapping 700 storing at least replacement dial-in phone numbers. As mentioned previously with respect to FIGS. 6B and 6C, mapping 700 in some embodiments stores information mapped to preferred dial-in numbers. Mapping 700 is implemented as a table in FIG. 7, but as mentioned with respect to FIG. 6A, block 605, mapping 700, in some embodiments, can be implemented as a relational database, a flat database, a hierarchical database, an object-oriented database, storage on mobile device 130 (including, for example, storage in Memory Module 130, Data 227, or RAM 246), storage on a remote device, or the like.

Mapping 700, in some embodiments, contains columns 701 and 702. Column 701 represents "keys" in mapping 700. In some embodiments, keys stored in column 701, such as keys 701A, 701B, and 701C, comprise data from received communications, such as communication 500 in FIG. 5. As described earlier with respect to FIGS. 6B and 6C, the data from received communications stored in keys 701A, 701B, and 701C comprises, in some embodiments, data that is searched for in received communications. In some embodiments, the data contained in keys under column 700A is associated with or "mapped" to data contained in column 702. Column 702, in some embodiments contains data on preferred numbers. These preferred numbers, in some embodiments, comprise replacement dial-in numbers as previously mentioned with respect to FIGS. 6A-6C.

Other embodiments will be apparent to those skilled in the art from consideration of the specification and practice of the embodiments disclosed herein.

What is claimed is:

1. A method, comprising:
   receiving, by a processor, from an electronic device associated with a sender, a calendar invitation directed to a mobile device, wherein the calendar invitation comprises dialing-in information for a conference call;
   determining, at the processor, the dialing in information is included in a mapping to alternative conference call phone numbers, wherein the mapping is stored in the mobile device, and the mapping includes each of a plurality of keys mapped to separate one of the replacement conference call phone numbers;
   in response to determining that the dialing-in information matches to a stored phone number, determining, by the processor, an alternate conference call phone number based on the mapping;
   updating the calendar invitation with the alternate conference call phone number; and
   sending the updated calendar invitation to the mobile device comprising the alternate conference call phone number, wherein the alternate conference call phone number can be used for dialing-in to the conference call.

2. The method of claim 1, wherein the determining further comprises determining a geographic location of the mobile device.

3. The method of claim 1, wherein determining the alternate conference call phone number further comprises determining a home network associated with the dialing-in information in the calendar invitation or determining a current network associated with a current location of the mobile device, wherein the alternate conference call phone number is associated with the determined current network.

4. The method of claim 1, wherein receiving the calendar invitation further comprises receiving the calendar invitation from the mobile device.

5. The method of claim 1, wherein sending the updated calendar invitation to the mobile device further comprises sending the updated calendar invitation to a first mobile device;
   wherein receiving the calendar invitation further comprises receiving the calendar invitation from a second mobile device.

6. A server, comprising:
   a processor; and
   memory storing instructions that, when executed by the processor, cause the server to:
     receive, by the processor, from an electronic device associated with a sender, a calendar invitation directed to a mobile device that comprises dialing-in information for a conference call;
     determining, by the processor, the dialing in information is included in a mapping to alternative conference call phone numbers, wherein the mapping is stored in the mobile device, and the mapping includes each of a plurality of keys mapped to one of the replacement conference call phone numbers;
     in response to determining that the dialing-in information matches to a stored phone number, determine, by the processor, an alternate conference call phone number based on the mapping;
     update the calendar invitation with the alternate conference call phone number; and
     send the updated calendar information to the mobile device comprising the alternate conference call phone number, wherein the alternate conference call phone number can be used for dialing-in to the conference call.

7. The server of claim 6, wherein the calendar invitation further comprises a geographic location of the mobile device.

8. The server of claim 6, wherein determining the alternate conference call phone number further comprises determining a home network associated with the dialing-in information in the calendar invitation or determining a current network associated with a current location of the mobile device, wherein the alternate conference call phone number is associated with the determined current network.

9. The server of claim 6, wherein receiving the calendar invitation further comprises receiving the calendar invitation from the mobile device.

10. The server of claim 6, wherein sending the updated calendar information to the mobile device further comprises sending the updated calendar information to a first mobile device;
    wherein receiving the calendar invitation further comprises receiving the calendar invitation from a second mobile device.

* * * * *